United States Patent
Lonsdale, II et al.

(10) Patent No.: US 8,777,002 B2
(45) Date of Patent: Jul. 15, 2014

(54) PROTECTIVE CASE WITH SUBSTANTIALLY-RIGID OUTER LAYER AND CUSHIONING INNER LAYER

(75) Inventors: Thomas J. Lonsdale, II, Austin, TX (US); David Council Benker, Cedar Park, TX (US)

(73) Assignee: Shark-Eye LLC, Austin, TX (US)

( * ) Notice: Subject to any disclaimer, the term of this patent is extended or adjusted under 35 U.S.C. 154(b) by 232 days.

(21) Appl. No.: 13/233,119

(22) Filed: Sep. 15, 2011

(65) Prior Publication Data

US 2012/0037524 A1    Feb. 16, 2012

Related U.S. Application Data

(63) Continuation-in-part of application No. 12/853,494, filed on Aug. 10, 2010.

(51) Int. Cl.
  *B65D 81/02*    (2006.01)
  *G06F 1/16*    (2006.01)

(52) U.S. Cl.
  CPC ............ *G06F 1/1656* (2013.01); *G06F 1/1626* (2013.01); *G06F 2200/1633* (2013.01)
  USPC .......................................... 206/320; 206/521

(58) Field of Classification Search
  USPC ................ 206/320, 523, 521, 305; 455/575.8
  See application file for complete search history.

(56) References Cited

U.S. PATENT DOCUMENTS

| | | | |
|---|---|---|---|
| 1,107,985 A | 8/1914 | Moskowitz | |
| 2,099,122 A | 11/1937 | Kreisler | |
| 2,105,550 A | 1/1938 | Pilliodet et al. | |
| 3,930,577 A | 1/1976 | Kortick | |
| 4,162,024 A | 7/1979 | Shanley | |
| 4,465,187 A | 8/1984 | Kinard et al. | |
| 5,816,459 A | 10/1998 | Armistead | |
| 6,683,250 B2 | 1/2004 | Luettgen et al. | |
| 6,785,566 B1 * | 8/2004 | Irizarry | 455/575.8 |
| 7,069,063 B2 * | 6/2006 | Halkosaari et al. | 455/575.8 |
| 7,072,699 B2 | 7/2006 | Eiden | |
| D525,781 S | 8/2006 | Arney et al. | |
| D538,034 S | 3/2007 | Moghaddam | |
| 7,635,086 B2 | 12/2009 | Spencer | |
| 7,644,820 B2 * | 1/2010 | Hohne et al. | 206/523 |
| 7,663,878 B2 * | 2/2010 | Swan et al. | 361/679.56 |

(Continued)

OTHER PUBLICATIONS

Slider Case, http://www.goincase.com/products/detail/cl59667, Oct. 13, 2011.

(Continued)

*Primary Examiner* — Steven A. Reynolds
(74) *Attorney, Agent, or Firm* — Panitch Schwarze Belisario & Nadel LLP

(57) ABSTRACT

A handheld device, such as a mobile phone, personal digital assistant (PDA), tablet computer, palmtop computer, or the like, can be protected from physical shock by being suspended within a multiple layer enclosure forming a protective case. The protective case includes an outer shell and an inner cushioning layer comprising one or more cushions. The cushions can be interlocked with opposing ends of the outer shell via an interlocking connection, so that the pieces of the cushion layer can be secured within the protective case. The cushions can cooperate to suspend the handheld device within the enclosure of the protective case and isolate the handheld device from the outer shell to protect the handheld device from physical shocks imparted to the outer shell.

22 Claims, 4 Drawing Sheets

(56) References Cited

U.S. PATENT DOCUMENTS

| | | | |
|---|---|---|---|
| 7,907,394 B2 | 3/2011 | Richardson | |
| 7,933,122 B2 | 4/2011 | Richardson | |
| 8,286,789 B2 * | 10/2012 | Wilson et al. | 206/320 |
| 8,442,604 B1 * | 5/2013 | Diebel | 455/575.8 |
| 2002/0005424 A1 | 1/2002 | Lange et al. | |
| 2002/0193136 A1 * | 12/2002 | Halkosaari et al. | 455/550 |
| 2003/0068035 A1 * | 4/2003 | Pirila et al. | 379/447 |
| 2009/0080153 A1 | 3/2009 | Richardson | |
| 2010/0048267 A1 | 2/2010 | Lin | |
| 2010/0072334 A1 | 3/2010 | Le Gette | |
| 2010/0147737 A1 | 6/2010 | Richardson | |
| 2010/0200456 A1 * | 8/2010 | Parkinson | 206/701 |
| 2011/0073505 A1 * | 3/2011 | Stiehl | 206/320 |
| 2011/0090632 A1 | 4/2011 | Raff | |
| 2011/0259664 A1 * | 10/2011 | Freeman | 181/202 |
| 2012/0008269 A1 | 1/2012 | Gengler | |
| 2012/0031788 A1 | 2/2012 | Mongan et al. | |
| 2012/0037536 A1 | 2/2012 | Lonsdale, II et al. | |
| 2012/0055824 A1 * | 3/2012 | Nash | 206/320 |
| 2012/0084896 A1 | 4/2012 | Wyner et al. | |
| 2012/0118769 A1 * | 5/2012 | Conner et al. | 206/320 |
| 2013/0098790 A1 * | 4/2013 | Hong et al. | 206/320 |

OTHER PUBLICATIONS

Inspiretech Full Protector Case, http://www.inspiretech.com/p-380-iphone-3g-full-protector-case-red.aspx, Oct. 13, 2011.
Otterbox Commuter Series Case, http://www.otterbox.com/iPhone-4-Commuter-Series-Case/APL4-14XXX,default,pd. html, Oct. 13, 2011.
Otterbox Reflex Series Case, http://www.otterbox.com/iPhone-4-Reflex-Series-Case/APL7-14UNI-20_E4OTR,default, pd.html, Oct. 13, 2011.
Office Action issued Jun. 8, 2012, in U.S. Appl. No. 12/853,494.
IPhone 4S: OtterBox Defender Case is Ultimate Protection by John Martellaro. The Mac Observer Nov. 29, 2011, 6 pages.
Incipio's Silicrylic offers unique two-piece design by Rob Renk. Macworld.com, Feb. 23, 2012, 3 pages.
Office Action issued Apr. 29, 2013 in U.S. Appl. No. 12/853,494.
Office Action issued Oct. 16, 2012 in U.S. Appl. No. 12/853,494.

* cited by examiner

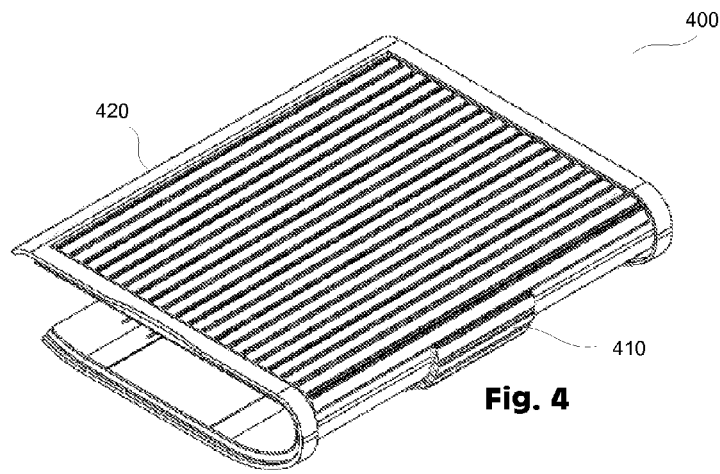
Fig. 4
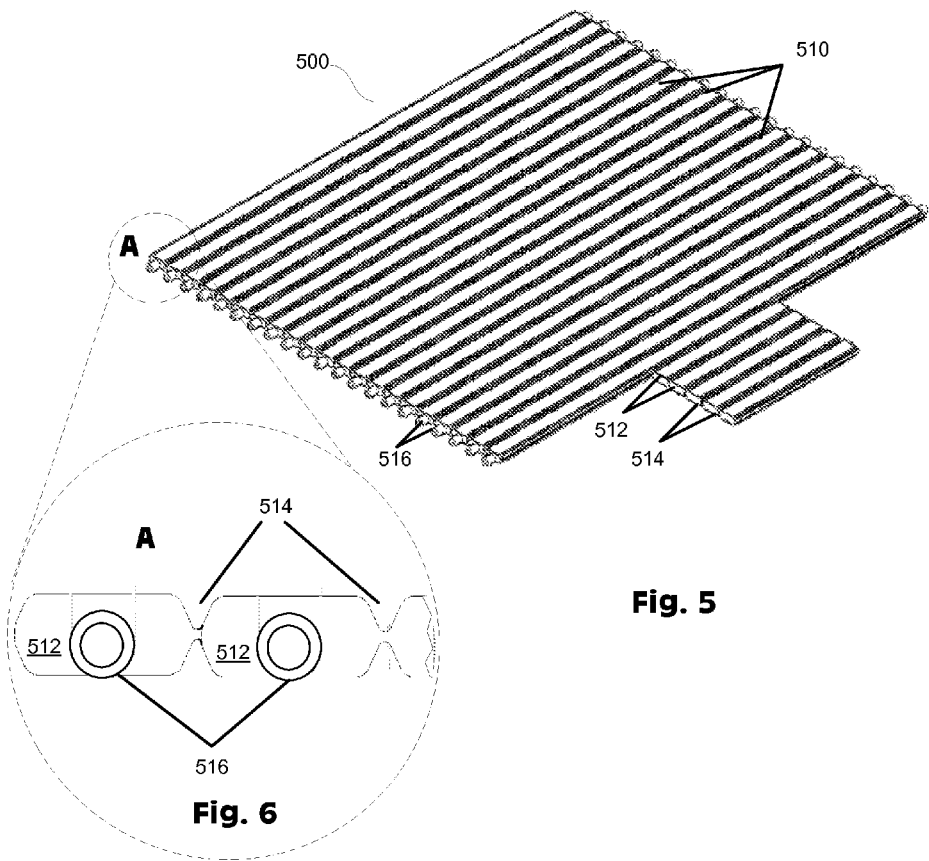
Fig. 5
Fig. 6

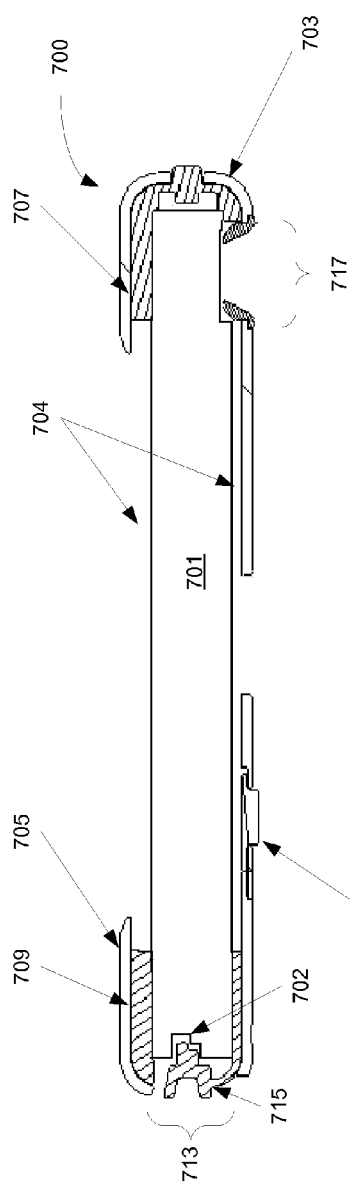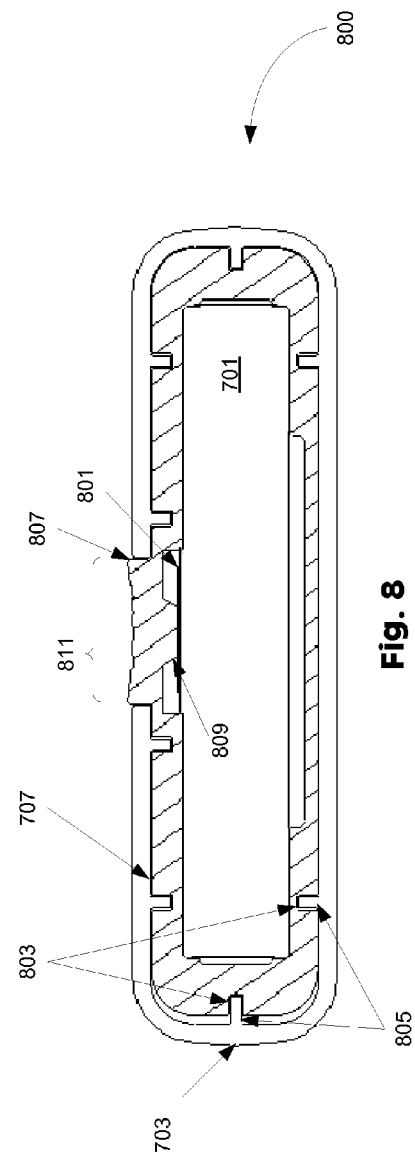

PROTECTIVE CASE WITH SUBSTANTIALLY-RIGID OUTER LAYER AND CUSHIONING INNER LAYER

CROSS REFERENCE TO RELATED PATENTS

This application is a continuation in part of U.S. application Ser. No. 12/853,494, filed Aug. 10, 2010, and entitled "PROTECTIVE CASE WITH SLIDING DISPLAY COVER," which is incorporated herein in its entirety by reference for all purposes.

FIELD

The present disclosure relates generally to protective cases, and more particularly to protective cases having suspending cushions.

BACKGROUND

Most handheld electronic devices for example mobile phones, tablets, personal digital assistants (PDAs), and the like, are vulnerable to minor damage such as a scratched surface, to more severe damage such as the body cracking or internal damage from accidentally dropping or striking the device on a door, table edge, or the like.

Attempts to protect such handheld devices include carrying the device in a protective case made of rigid plastic or a single piece of flexible material. Protective cases made of rigid or substantially-rigid plastic do very little, if anything, to protect the device from anything more significant than minor scratching, while protective cases made from flexible materials tend to degrade easily from exposure and wear. Furthermore, protective cases that merely surround the device in a material, flexible or rigid, still tend to transmit at least some of a physical shock through the material to the device. Also, many of the protective cases leave the display screen exposed, and thus also provide limited, if any, protection for the display from physical shock.

Some cases require the user to remove the device from the case to view the display, while others provide a removable display cover, or a cover designed to be flipped open to expose the display. These cases, however, are not always easy to use. For example, it can be inconvenient to be forced to remove a device from its case before use. Likewise, covers that flip-open tend to be vulnerable to having the cover broken off.

Thus, it can be seen that currently available technology for protective cases is less than perfect.

SUMMARY

Various embodiments of the present disclosure allow a device configured to protect an electronic device from physical shocks.

In one aspect of the disclosure, a protective case, which can removably or irremovably couple with a holster, includes a substantially-rigid outer shell and two or more cushions that cooperate to suspend a mobile electronic device within the outer shell such that the mobile electronic device is isolated from the outer shell. The outer shell includes a first portion and a second portion, both of which are configured to matingly couple with each other to form an enclosure which has an aperture through which a display screen of a mobile electronic device positioned within the enclosure can be viewed. The first and second portions each have an inner surface adapted to receive and interlock with a first and second cushion, respectively. The first and second cushions each have an outer surface configured to interlock with the inner surface of the first portion and second portions of the outer shell, respectively, and an inner surface adapted to receive at least part of a first and second end of the mobile electronic device, respectively. The first cushion can interlock with the first portion of the outer shell via a first tongue-in-groove connection, and the second cushion can interlock with the second portion of the substantially-rigid outer shell via a second tongue-in-groove connection. The first and second cushions can each receive two first and two second corners of the mobile electronic device, respectively.

The outer shell can accommodate a particular model of mobile electronic device and includes a first aperture to enable access to an interface of the particular model of mobile electronic device. One or more cushions can fill the first aperture to provide indirect access to the interface, include a second aperture with a projected lining and can align the second aperture with the first aperture so the projected lining extends at least partially through the first aperture, and include a plug extending at least partially into the interface.

In another aspect of the disclosure, an apparatus, which can removably or irremovably couple with a holster, includes an outer shell having two pieces to slidably receive and interlock with each other to form an enclosure and two sleeves that cooperate within the enclosure to position the handheld device within the enclosure and substantially isolate it from contact with the outer shell. Each sleeve slidably receives two or more corners on generally opposing ends of the handheld device, and each piece of the outer shell slidably receives and interlocks with one of the two sleeves. Each piece of the outer shell can slidably receive and interlock with one of the sleeves via a different tongue-and-groove connection.

In another aspect of the disclosure, a protective shell for an electronic device includes a multi-piece shell configured to interlock with the two or more separate pieces of a flexible lining and cooperate with the flexible lining to mechanically isolate the electronic device from the outer shell to shield the electronic device from physical shock. The separate pieces of the flexible lining interlock with generally opposing ends of the electronic device, and the pieces of the multi-piece shell interconnect to form an outer shell that substantially encloses the flexible lining.

BRIEF DESCRIPTION OF THE DRAWINGS

Aspects of this disclosure will become apparent upon reading the following detailed description and upon reference to the accompanying drawings, in which like references may indicate similar elements:

FIG. 4 is a perspective view of a roll-top display cover slidably mounted in a track, according to embodiments of the present disclosure;

FIG. 5 is a perspective view of a roll-top display cover, according to embodiments of the present disclosure;

FIG. 6 is an exploded side view of portion A of FIG. 5;

FIG. 7 is a side view of a protective case having interlocking layers, according to various embodiments of the present disclosure;

FIG. 8 is an end view of a protective case having interlocking layers, according to various embodiments of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Figures 1, 2:
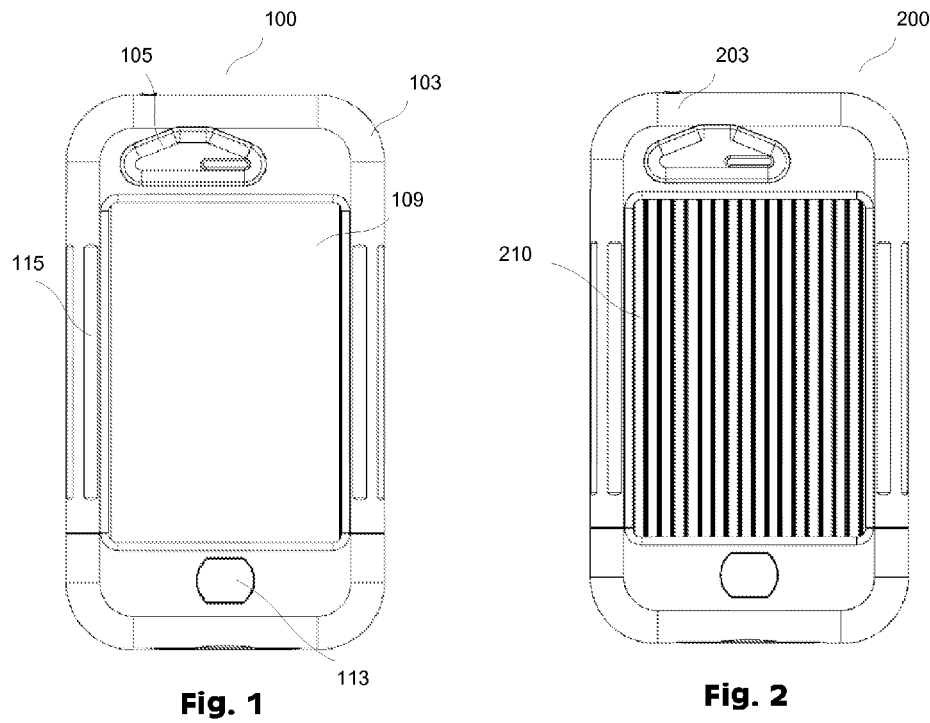
FIG. 1 is a top view of a protective case holding a portable electronic device and having a sliding display cover in an open position, according to embodiments of the present disclosure.
FIG. 2 is a top view of a protective case holding a portable electronic device, and having a sliding display cover in a closed position, according to embodiments of the present disclosure.

Referring first to FIG. 1, a protective case 100 (alternatively referred to herein as a "protective cover" or "protective shell") according to various embodiments of the present disclosure is shown with a sliding display screen cover is illustrated and discussed. Protective case 100 includes an outer shell 103 having various openings (herein referred to as "apertures") 105, 109, and 113, and hand grips 115. Outer shell 103 can be constructed of various different materials to protect an electronic device enclosed within an enclosure formed by outer shell 103 from physical shock due to accidentally bumping, dropping or striking protective case 100. For example, in some embodiments, outer shell 103 can be constructed of a substantially rigid plastic, rubber, metal, metal alloy, or other material, that can be selected to provide various degrees and types of protection, and to achieve a desired size profile. Various materials and finishes can also be used to make protective case 100 easier to grip, easier to slide in and out of a pocket or purse, or to achieve another desired tactile characteristic. In some embodiments, a flexible rubber or rubber-like material can be used. In some embodiments protective case 100 also provides moisture resistance or insulation.

Outer shell 103 can be constructed of a single piece of material, or can be constructed in multiple different portions (also referred to as "pieces" or "outer layers") that can be snapped, clasped, glued, interlocked, mated, or otherwise joined or coupled to form the entire outer shell 103. For example, in some embodiments, outer shell 103 can be a unitary piece of relatively flexible material that can be temporarily stretched or deformed to allow insertion of an electronic device through aperture 109 or another opening (not illustrated). In other embodiments, one or more rigid or semi-rigid portions of outer shell 103 can be disassembled to allow insertion of an electronic device, then reassembled around the inserted electronic device.

In at least one embodiment, outer shell 103 includes apertures 105, 109, and 113 that are specifically configured for use with a particular electronic device. For example, aperture 105 can be configured to correspond to the position of a speaker in a mobile telephone (alternatively referred to herein as a "cellular phone"), aperture 113 can be used to accommodate a pushbutton or other user input device, and aperture 109 can be sized and positioned to accommodate a display screen of an electronic device, such an iPhone, a Droid, or another similar device. In various embodiments, outer shell 103 can be constructed or modified to include additional or fewer apertures to accommodate various features of various different handheld or portable electronic devices. For example, outer shell 103 can include an aperture in the back of outer shell 103 (not illustrated) to accommodate a camera included on an electronic device. In some embodiments, only the exact number of apertures needed for use with a particular electronic device are included in outer shell 103, while other embodiments can be generically constructed for use with multiple different electronic devices, and may therefore include some apertures not used for any one particular device.

As illustrated in FIG. 1, protective case 100 includes an aperture 109 sized and positioned for use in conjunction with an electronic device having a display screen and positioned within outer shell 103. Aperture 109 can, in some embodiments, be covered with a substantially clear material. This clear material can be rigid or flexible, and of any desired thickness. However, in at least one embodiment, the clear material is constructed to be thin enough to permit user interaction with a touch screen display included on the electronic device. In other embodiments, aperture 109 is left uncovered to facilitate access to the display screen of the electronic device.

Protective case 100 includes a slidable display cover configured to slide over opening 109 to cover the display screen of an electronic device located within outer shell 103 and protect the display screen from physical shock. The slidable display cover is not visible in FIG. 1, because it has been slid into an open position. In some embodiments, the slidable display cover may be partially visible even when it is in a fully open position.

In some embodiments, protective case 100 includes one or more cushions (alternatively referred to herein as "flexible linings", "layers", "inner layers", or "sleeves") that lie between the inner surface of the outer shell 103 and the electronic device located within the protective case 100. The cushions are not visible in FIG. 1, and are illustrated and discussed further in FIGS. 7-9 below.

Referring next to FIG. 2, protective case 200 is illustrated with a display screen cover 210 in a closed, or protective position, covering an opening (not visible) in outer shell 203. In various embodiments, display screen cover 210 can be slid open or closed to alternately expose or cover an opening such as aperture 109 (FIG. 1). At least one embodiment implements display screen cover 210 in a "roll-top" configuration. For example, when display screen cover 210 is slid from left to right to expose the opening in outer shell 203, display screen cover 210 slides around the right edge and around the back of the electronic device held within protective case 200. In some embodiments, display screen cover 210 can wrap externally around outer shell 203. In other embodiments, display screen cover 210 wraps around the inside of outer shell 203.

Although the examples discussed herein generally describe a display screen cover that wraps around a left or right side of an electronic device, embodiments that slide up or down and wrap around the top or bottom edge of the electronic device are also contemplated, consistent with the configuration of the electronic device placed within the protective case. In yet other embodiments, display screen cover 210 can be an accordion-style door (not illustrated) having lateral elements that fold up on one another as the door is slid into an open position. Various embodiments further include multi-part doors.

A display screen cover 210 according to various embodiments can be constructed of rigid or semi-rigid materials, which can help to absorb or deflect physical shock from the display of an electronic device when the display screen cover 210 is in a closed position. In some embodiments, display screen cover 210 can be constructed of a transparent, semi-transparent, translucent, or other material that allows viewing of the display screen of an electronic device held within outer shell 203, even when display screen cover 210 is in a closed position. In other embodiments, display screen cover is substantially opaque.

Figure 3:
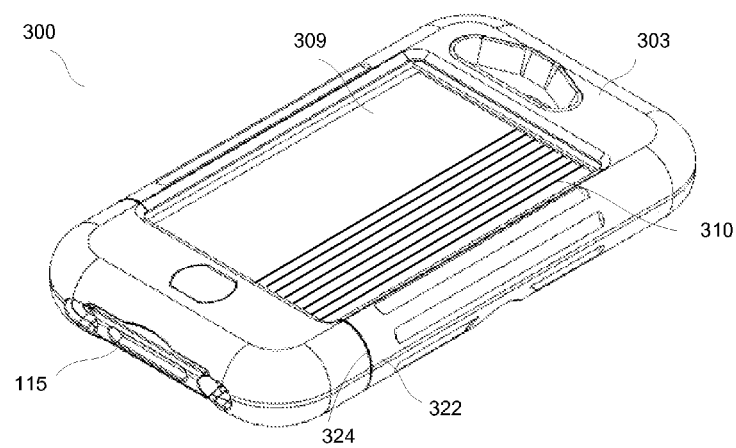
FIG. 3 is a perspective view of a protective case holding a portable electronic device, and having a sliding display cover in a partially open position, according to embodiments of the present disclosure.

Referring next to FIG. 3, protective case 300, which includes a sliding door 310 partially covering aperture 309 in outer shell 303, is illustrated. Outer shell 303 also includes aperture 115, configured to allow access to various connectors, interfaces, or the like included on an electronic device housed within protective case 300. Although not specifically illustrated, outer shell 303 may also include various plugs, covers, or the like that extend partially or fully into the various connectors, interfaces, or the like included on an electronic device housed within protective case 300 and can be used to close aperture 115 when access to the connectors, interfaces, or ports through aperture 115 is not desired.

Outer shell 303 also includes seams 322 and 324, which illustrate points at which various separate portions (or "layers") of outer shell 303 can be disassembled or assembled. For example, in some embodiments, the bottom portion of outer shell 303 can be separated from the top portion at seam 324, thereby facilitating placement of an electronic device therein. In other embodiments, the front and back portions of outer shell 303 can be separated at seam 322, and then reassembled after an electronic device has been inserted. In some embodiments, outer shell 303 is the housing provided by the manufacturer of an electronic device, and the sliding door 310 is integral with, or attachable to, the primary housing of the electronic device. Put another way, the electronic and other components of an electronic device, including for example the display screen, can be housed within, or integrated with, protective case 300.

Referring next to FIG. 4, a cover and track assembly 400 is illustrated according to various embodiments of the present invention. Cover and track assembly 400 includes sliding display cover 410 and track 420. Track 420 can be formed a rigid or semi-rigid plastic, metal, metal alloy, rubber-like material, or other material, and is constructed to mate with sliding display cover 410. In embodiments like those illustrated in FIG. 4, track 420 can be mounted to an outer shell, such as those illustrated and discussed with respect to FIGS. 1-3, so that an electronic device can be placed inside of track assembly 400, so that a display screen of the electronic device (not illustrated) can be alternately covered or exposed as sliding display cover 410 is slid to an open or closed position. Note that as sliding display cover 410 is slid open to expose the display of the electronic device, sliding display cover 410 will wrap around an outside edge of the device, and in some embodiments at least partially around the back of an electronic device placed inside of track assembly 400.

In some embodiments, track 420 is formed as an integral part of a protective case, such as those illustrated and discussed in FIGS. 1-3. Furthermore, in some such embodiments, track 420 does not extend entirely around an edge of an electronic device placed inside of the protective case. Instead, the track can extend only along an edge of an aperture 309 (FIG. 3). In some such embodiments, a device placed inside of the protective case can guide the movement of any portion of sliding display cover 410 that is not current engaging track 420. Furthermore, in some embodiments track 420 may engage only one side of sliding display cover 410.

Various methods and types of engaging mechanisms can be used to connect sliding display cover 410 to track 420. For example, track 420 may include one or more grooves into which one or more pins of sliding display cover 410 fit. In other embodiments, various rail, bearing, wheel, and continuous or semi-continuous male and female coupling techniques can be used to couple sliding display cover 410 to track 420. In some embodiments, track 420 may consist essentially of a pin or other protrusion configured to mate with a corresponding receiver connected to, or formed in, sliding display cover 410. At least one embodiment contemplates that each side of track 420 consists essentially of an upper and lower portion that protrude over and guide individual slats or ribs of sliding display cover 420.

Referring next to FIG. 5, a display cover 500 according to various embodiments is illustrated. Display cover 500 includes a series horizontal members 510 connected to each other and positioned side by side. In the illustrated embodiment, each of the horizontal members includes a protrusion 516 that can be slidably mated to a track in a protective cover, as discussed in FIGS. 1-4. As illustrated, display cover 500 is constructed from a single piece of material by forming lands 512 separated by grooves 514 cut into the material. The illustrated configuration allows display cover 500 to bend or flex when moved along track included in a protective case.

Referring briefly to FIG. 6, an expanded view of an edge of display cover 500 is illustrated. The expanded view shows the lands 512, grooves 514, and protrusions 516.

Although FIGS. 5 and 6 specifically illustrate a display cover 500 constructed from a single piece of material, other embodiments of display cover 500 can use individual slats, bars, or the like. In some such embodiments, the slats or bars can be connected by a strapping material, or simply placed next to each other and held in place by an external frame (not illustrated). In yet further embodiments, the display cover can be a unitary door constructed from one or more pieces of material without lands and grooves. Such a door should be flexible enough to bend at least partially around an outside portion of an electronic device when slid along a track included in a protective cover as described herein.

Referring next to FIG. 7, protective case 700, which includes multiple layers, is illustrated. The layers can include outer layers (alternatively referred to herein as "outer shell portions", "pieces of an outer shell", "pieces of a multi-piece shell" or the like) 703 and 705, and inner layers (alternatively referred to herein as "cushions", "sleeves", "pieces of a flexible lining", or the like) 707 and 709. In some embodiments, protective case 700 can be adapted to protect an electronic device 701 from physical shock by isolating or substantially isolating the electronic device from outer layers 703 and 705 via inner layers 707 and 709. The outer shell can be adapted to accommodate a particular model of electronic device 701 including, but not limited to, mobile telephones, or other communication devices, tablets, televisions, radios, audio visual devices, audio players, timekeeping devices, personal digital assistants (PDAs), and other computing devices. As shown in the illustrated embodiment, inner layers 707 and 709 can suspend or position electronic device 701 within an enclosure formed by outer layers 703 and 705, thereby isolating electronic device 701 from the outer layers 703 and 705 by inner layers 707 and 709 and empty space 704. Physical shocks imparted to outer layers 703 or 705 can be absorbed in part or in full by either inner layers 707 and 709 or empty space 704 before electronic device 701 is affected. In some embodiments, the outer layers 703 and 705 and the inner layers 707 and 709 can be constructed of different materials with different levels of flexibility. For example, outer layers 703 and 705 can be constructed of a substantially-rigid material including, but not limited to, a hard plastic, while inner layers 707 and 709 can be constructed of a flexible material including silicone, rubber, or the like.

In some embodiments, inner layers 707 and 709 receive part or all of electronic device 701. For example, inner layers 707 and 709 may each fit over or receive one or more corners of electronic device 701. Inner layers 707 and 709 can fit over generally opposing ends or corners of electronic device 701 such that, when electronic device 701 and inner layers 707 and 709 are positioned within the enclosure formed by outer layers 703 and 705, electronic device is suspended within the enclosure at opposing ends or corners by inner layers 707 and 709.

In some embodiments, outer layers 703 and 705 receive inner layers 707 and 709. As shown in the illustrated embodiment, the inner surface of outer layer 703 may removably or irremovably interlock, matingly couple, slidably join, or the like with the outer surface of inner layer 707 via one or more various connection types, such as a sliding connection. As discussed below in FIG. 8, such connection types may include, but are not limited to, tongue-and-groove connections or some other connection between outer layer 703 and inner layer 707 and outer layer 705 and inner layer 709.

Outer layers 703 and 705 can include one or more apertures 713, configured to allow access to various interfaces 702 (alternatively referred to herein as connectors, ports, or the like), included on an electronic device housed within protective case 700. Interfaces 702 can include, but are not limited to, headphone jacks, power jacks, buttons, cameras or camera lenses, display screens, and the like. As shown in the illustrated embodiment, inner layer 709 can include a plug 715 that can cover an interface 702 and, where interface 702 includes a recess or port that extends into electronic device 701, plug 715 may include a protrusion that extends partially or fully into interface 702. Plug 715 can be used to close aperture 713 when access to the interface 702 through aperture 713 is not desired. In some other embodiments, plug 715 may be located on or coupled to inner layer 707, outer layers 703 or 705, or some other part of protective case 700. In some embodiments, outer layers 703 and 705 can include one or more apertures 717 configured to allow access to various parts of an electronic device housed within protective case 700.

As discussed above in FIG. 3, outer layers 703 and 705 can be assembled and disassembled along a seam 322 or 324. When assembled, outer layers 703 and 705 can be interlocked with each other, matingly coupled, or the like via a connection 711. For example, in the illustrated embodiment, outer layers 703 and 705 are matingly coupled at seam 324 (not illustrated) via an interlocking connection 711. In some other embodiments, outer layers 703 and 705 may be matingly coupled, interlocked, or the like at seam 322 via an interlocking connection located elsewhere on the outer layers 703 and 705.

Referring next to FIG. 8, protective case 800, which includes at least outer layer 703 and inner layer 707, is illustrated. In some embodiments, protective case 800 can be adapted to protect an electronic device 701 from physical shock by isolating the electronic device from the outer layer 703 via inner layer 707. Inner layer 707 can, in some embodiments, be configured to be coupled, interlocked, mated, or the like with outer layer 703. Coupling between inner layer 707 and outer layer 703 can be facilitated by one or more connections. For example, in the illustrated embodiment, the outer surface of inner layer 707 includes multiple grooves 803 that are each configured to receive a tongue 805 located on the inner surface of outer layer 703. Together, each tongue 805 on the inner surface of outer layer 703 can cooperate with a corresponding groove 803 on the outer surface of inner layer 707 to form a tongue-and-groove connection between inner layer 707 and outer layer 703. In some embodiments, inner layer 707 and outer layer 703 can be interlocked via one or more tongue-and-groove connections, male-female interlocks, sliding connections, or some other type of connection or combination thereof.

In some embodiments, inner layer 707 can be coupled to outer layer 703 such that the two parts interlock in a snug fit to prevent loss of coupling, yet also permitting inner layer 707 to be removed from the outer layer 703 by a user. In the illustrated embodiment, inner layers 707 and 709 are interlocked with outer layers 703 and 705 via a tongue-and-groove connection. Inner layer 707 may be removed from outer layer 703 by sliding inner layer 707, parallel to the tongue-and-groove connection, out of the partial enclosure formed by outer layer 703. In some embodiments where the type of connection is a male-female interlock, inner layer 707 may be removed by disengaging the interlock between inner layer 707 and outer layer 703.

In some embodiments, electronic device 701 includes an interface 801, such as a button. Protective case 800 can be configured to enable a user to access, activate, or otherwise interact with electronic device 701, via interface 801, while it is positioned within protective case 800. For example, outer layer 703 can include an aperture 811 that is located on outer layer 703 in a location that enables a user to access interface 801 through aperture 811. Inner layer 707 may, in some embodiments, extend over interface 801 to shield interface 801 from physical shocks or some other type of damage. Peg 809 may enable a user to continue to access, activate, or otherwise interact with interface 801 indirectly by contacting interface 801 when a user makes contact with the overlying portion of inner layer 707 that is exposed to the user by aperture 811. One or more parts of inner layer 707 can be adapted into the form of a button 807 that can partially or completely fill the gap in outer layer 703 formed by aperture 811 to provide ease of user access to interface 801 through aperture 811.

Figure 9:
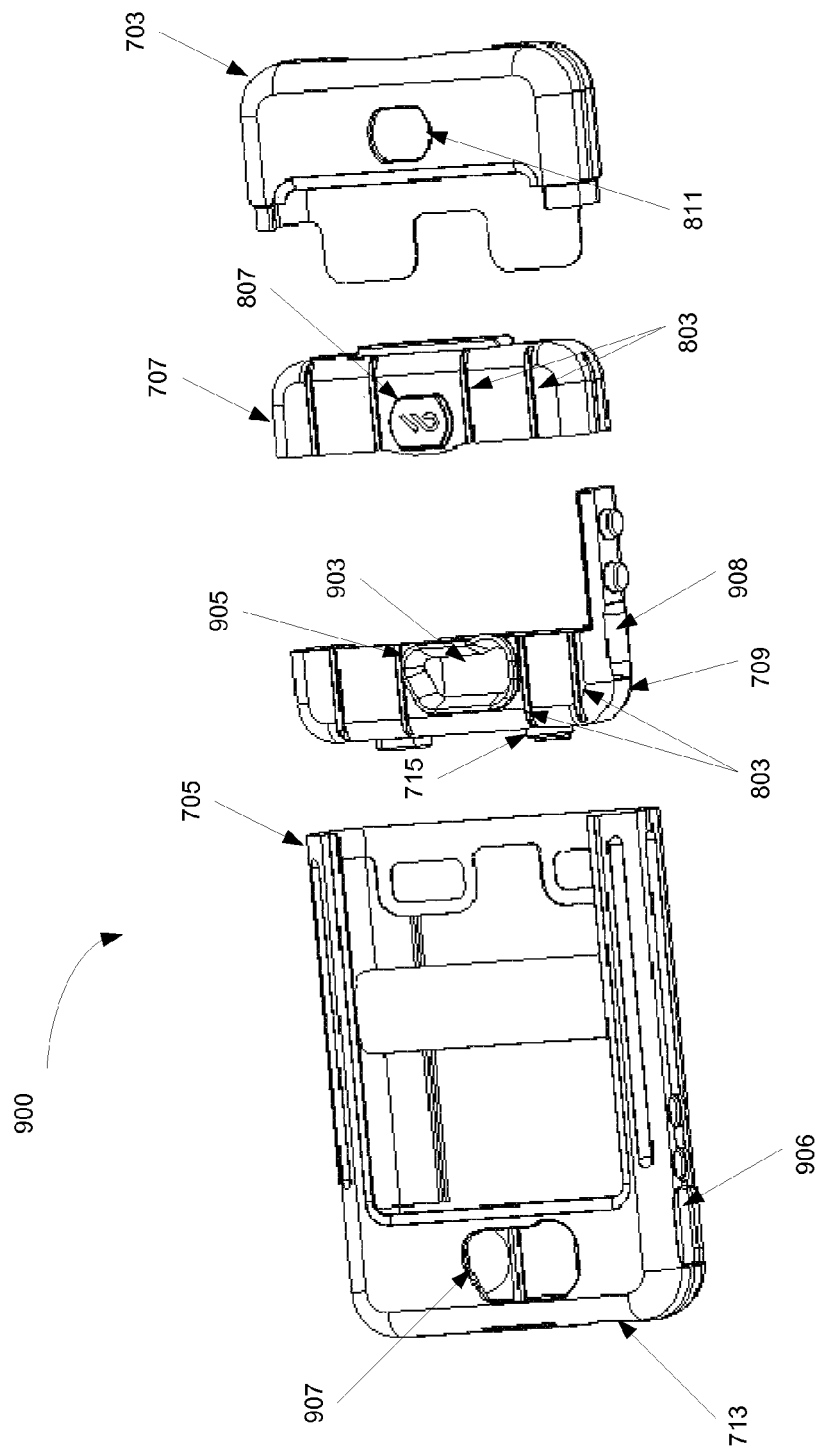
FIG. 9. is an expanded perspective view of a protective case having interlocking layers, according to various embodiments of the present disclosure

Referring now to FIG. 9, and expanded view of protective case 900, which includes outer layer 703 and 705 and inner layers 707 and 709, is illustrated. In the illustrated embodiment, inner layers 707 and 709 are adapted to fit over generally opposing ends of an electronic device (not illustrated). In some other embodiments, inner layers 707 and 709 may be adapted to fit over one or more corners of the electronic device. Protective case 900 may also include additional layers to cover parts of the electronic device. As shown in the illustrated embodiment, outer layer 703 can receive inner layer 707 and outer layer 705 can receive inner layer 709. Each outer layer 703 and 705, in some other embodiments, receives more than one inner layer. For example, outer layer 703 may receive two inner layers that each fit over one corner of an electronic device, two inner layers that each fit over generally opposing ends of an electronic device such that only part of each inner layer is received by outer layer 703, or the like.

In some embodiments, one or more inner layers 707 and 709 interlock with one or more outer layers 703 and 705. As shown in FIG. 9, one or more grooves 803 on the outer surface of inner layer 707 may receive one or more tongues 805 on the inner surface of outer layer 703 so that inner layer 707 is interlocked with outer layer 703. Inner layer 709 can also have one or more grooves 803 that can receive tongues (not illustrated) on the inner surface of outer layer 705 so that inner layer 709 is interlocked with outer layer 705. In some embodiments, inner layers 707 and 709 may have different types or configurations of connections with one or more of outer layers 703 and 705. For example, inner layer 707 may interlock with outer layer 703 via a tongue-and-groove connection and inner layer 709 may interlock with outer layer 705 via a male-female interlock.

One or more of outer layers 703 or 705, or some other additional outer layers, may include one or more apertures 713, 811, 906, and 907. As discussed and illustrated above in FIGS. 7-8, one or more apertures 713, 811, 906, and 907 on outer layers 703 and 705 can enable a user to access one or more interfaces, connectors, ports, or the like on an electronic device positioned within the enclosure formed by assembled outer layers 703 and 705. As discussed and illustrated above in FIG. 8, one or more parts of inner layers 707 and 709 may be formed into buttons 907 that can partially or completely fill one or more of the apertures in one of outer layers 703 and 705. For example, in the illustrated embodiment, part of inner layer 707 fills aperture 811 as a button 807 to enable a user to easily access, activate, or otherwise interact with an interface on the electronic device that is covered by inner layer 707. As also discussed and illustrated above in FIG. 7, one or more of inner layers 707 and 709 may include a plug 715 that can cover, and may also extend in part or in full into, an interface on the electronic device that would otherwise be exposed by aperture 713. For example, the illustrated embodiment includes a cover on inner layer 709 that can cover and extend into an interface on the electronic device received by inner layer 709 and can be removed to enable a user to access the interface through aperture 713 when desired.

In some embodiments, one or more parts of inner layers 707 and 709 may include apertures positioned to align with one or more apertures on outer layers 703 and 705. In the illustrated embodiment, inner layer 709 includes apertures 903 and 908 which are configured to align with apertures 907 and 906, respectively, on outer layer 705. Apertures 903 and 908 allow unhindered access to one or more interfaces on an electronic device positioned within the enclosure formed by outer layers 703 and 705. In some embodiments, an aperture 903 on inner layer 707 may include a projected lining 905 that extends along the edge of aperture 903 and projects outward from inner layer 707 and partially or fully through aperture 907 to provide additional protection to the interface of the electronic device. For example, apertures 903 and 907, when aligned, can allow an interface such as a camera lens, microphone, or the like to record the environment while projected lining 905 provides shielding from glare, physical shocks, or some other external interference that might adversely affect the quality of pictures, videos, sounds, or the like recorded by the interface.

As used herein, the terms "electronic device," "mobile electronic device," "tablet," "handheld device," "portable device," and similar terms are used interchangeably to refer to various different devices that can be carried by person and include a display screen. Examples of electronic devices include, but are not limited to, mobile telephones, cellular phones, or other communication devices, televisions, radios, audio visual devices, audio players, timekeeping devices, personal digital assistants (PDAs), and other computing devices.

Various embodiments of a multi-layer protective case have been described to a level of detail that will allow one of ordinary skill in the art to make and use the claimed invention. Although more than one embodiment has been discussed, other variations and modifications of the disclosed embodiments can be made based on the description provided, without departing from the scope of the invention as set forth in the following claims.

What is claimed is:

1. A protective case comprising:
a substantially-rigid outer shell comprising a first portion and a second portion, the first portion and second portion configured to matingly couple with each other to form an enclosure including an aperture through which a display screen of a mobile electronic device positioned within the enclosure can be viewed;
the first portion of the substantially-rigid outer shell having an inner surface adapted to receive and interlock with a first cushion;
the first cushion having an outer surface configured to interlock with the inner surface of the first portion of the rigid outer shell and having an inner surface adapted to receive at least part of a first end of the mobile electronic device;
the second portion of the substantially-rigid outer shell having an inner surface adapted to receive and interlock with a second cushion;
the second cushion having an outer surface configured to interlock with the inner surface of the second portion of the substantially-rigid outer shell and having an inner surface adapted to receive at least part of a second end of the mobile electronic device;
wherein the first cushion and the second cushion cooperate to suspend the mobile electronic device within the outer shell such that the mobile electronic device is isolated from the substantially-rigid outer shell;
wherein the substantially-rigid outer shell is adapted to accommodate a particular model of mobile electronic device, and further comprises a first aperture to enable access to an interface on the particular model of mobile electronic device; and
wherein at least one of the first cushion and the second cushion comprising a second aperture with a projected lining, the at least one of the first cushion and the second cushion adapted to align the second aperture with the first aperture such that the projected lining extends at least partially through the first aperture.

2. The protective case of claim 1, wherein:
the first cushion interlocks with the first portion of the substantially-rigid outer shell via a first tongue-in-groove connection; and
the second cushion interlocks with the second portion of the substantially-rigid outer shell via a second tongue-in-groove connection.

3. The protective case of claim 1, wherein:
the first cushion receives two first corners of the mobile electronic device; and
the second cushion receives two second corners of the mobile electronic device.

4. The protective case of claim 1, at least one of the first cushion and the second cushion adapted to fill the first aperture to provide indirect access to the interface of the particular model of mobile electronic device.

5. The protective case of claim 1, at least one of the first cushion and the second cushion comprising a plug adapted to extend at least partially into the interface of the particular model of mobile electronic device.

6. The protective case of claim 1 configured to removably couple with a holster.

7. An apparatus comprising:
a first sleeve to slidably receive at least two first corners of a handheld device;
a second sleeve to slidably receive at least two second corners of the handheld device, such that the first sleeve and the second sleeve slidably receive generally opposing ends of the handheld device;

an outer shell, comprising at least a first piece and a second piece configured to slidably receive and interlock with each other to form an enclosure;

wherein:

the first piece is configured to slidably receive and interlock with the first sleeve, and the second piece is configured to slidably receive and interlock with the second sleeve;

wherein the first sleeve and second sleeve cooperate within the enclosure to position the handheld device within the enclosure and substantially isolate the handheld device from contact with the outer shell;

wherein the outer shell is adapted to accommodate a particular model of handheld device, and further comprises a first aperture to enable access to an interface of the particular model of handheld device; and wherein at least one of the first sleeve and the second sleeve comprising a second aperture with a projected lining, the at least one of the first sleeve and the second sleeve adapted to align the second aperture with the first aperture such that the projected lining extends at least partially through the first aperture.

8. The apparatus of claim 7, wherein:

the first piece is configured to slidably receive and interlock with the first sleeve via a tongue-and-groove connection; and the second piece is configured to slidably receive and interlock with the second sleeve via a tongue-and-groove-connection.

9. The apparatus of claim 7, at least one of the first sleeve and the second sleeve adapted to fill the first aperture to provide indirect access to the interface of the particular model of handheld device.

10. The apparatus of claim 7, at least one of the first sleeve and the second sleeve comprising a plug adapted to extend at least partially into the interface of the particular model of handheld device.

11. The apparatus of claim 7 configured to removably couple with a holster.

12. A protective shell for an electronic device comprising:

a flexible lining comprising two or more separate pieces adapted to interlock with generally opposing ends of the electronic device;

a multi-piece shell configured to interlock with the two or more separate pieces of the flexible lining, the multi-piece shell comprising a first aperture to enable access to an interface of the electronic device;

wherein pieces of the multi-piece shell are configured to interconnect to form an outer shell that substantially encloses the flexible lining;

wherein the flexible lining and the multi-piece shell cooperate to mechanically isolate the electronic device from the outer shell to shield the electronic device from physical shock; and wherein at least one of the two or more separate pieces of the flexible lining comprising a second aperture with a projected lining, the at least one of the two or more separate pieces of the flexible lining adapted to align the second aperture with the first aperture such that the projected lining extends at least partially through the first aperture.

13. The protective shell of claim 12, at least one of the two or more separate pieces of the flexible lining adapted to fill the first aperture to provide indirect access to the interface of the electronic device.

14. The protective shell of claim 12, at least one of the two or more separate pieces of the flexible lining comprising a plug adapted to extend at least partially into the interface of the electronic device.

15. A protective case comprising:

a multi-piece shell having an outer shell back portion and a outer shell front portion;

wherein the outer shell back portion has an outer surface, an inner surface and at least one aperture configured to allow insertion of an electronic device;

wherein the inner surface of the outer shell back portion has at least one inner layer cushion disposed proximate to the inner surface and configured to separate the electronic device from the inner surface of the outer shell back portion;

wherein the outer shell back portion and the outer shell front portion are configured to interlock together to allow the electronic device to be secured;

wherein the outer shell is adapted to accommodate a particular model of handheld device, and further comprises an access aperture to enable access to an interface of the particular model of handheld device; and wherein the at least one inner layer cushion comprises a second access aperture with a projected lining, the at least one inner layer cushion adapted to align the second access aperture with the first access aperture such that the projected lining extends at least partially through the first access aperture.

16. The protective case of claim 15, wherein the outer shell back portion and the at least one inner layer cushion are integrally joined.

17. The protective case of claim 15, wherein the outer shell back portion comprises a first material and a second material, wherein the second material is less rigid than the first material.

18. The protective case of claim 17, wherein the at least one inner layer cushion comprises the second material and is integrally joined with the outer shell back portion.

19. The protective case of claim 15, wherein the outer shell front portion is configured to allow insertion of the electronic device and to cover at least a portion of a front side of the electronic device, and wherein the outer shell front portion is configured to fit within an outer perimeter of the at least one aperture of the outer shell back portion such that the outer shell front portion is interlocked with the outer shell back portion.

20. The protective case of claim 19, wherein the outer shell front portion has an opening configured to allow user access to the front side of the electronic device.

21. The protective case of claim 18, wherein the outer shell front portion is configured to allow insertion of the electronic device and to cover at least a portion of a front side of the electronic device, and wherein the outer shell front portion is configured to fit within an outer perimeter of the at least one aperture of the outer shell back portion such that the outer shell front portion is interlocked with the outer shell back portion.

22. The protective case of claim 21, wherein the outer shell front portion has an opening configured to allow user access to the front side of the electronic device.

* * * * *